(12) United States Patent
Suzuki

(10) Patent No.: US 8,171,975 B2
(45) Date of Patent: May 8, 2012

(54) APPARATUS FOR CAUSING PLANAR PARTS TO BE BONDED ONTO A SEAT PAD

(75) Inventor: Yoshinobu Suzuki, Tochigi (JP)

(73) Assignee: TS TECH Co., Ltd., Saitama (JP)

(*) Notice: Subject to any disclaimer, the term of this patent is extended or adjusted under 35 U.S.C. 154(b) by 621 days.

(21) Appl. No.: 12/200,977

(22) Filed: Aug. 29, 2008

(65) Prior Publication Data

US 2009/0084505 A1  Apr. 2, 2009

(30) Foreign Application Priority Data

Aug. 29, 2007  (JP) ................................ 2007-222609

(51) Int. Cl.
*B32B 37/00* (2006.01)

(52) U.S. Cl. ............ 156/538; 269/290; 269/48; 269/91; 156/580; 156/581

(58) Field of Classification Search .................. 156/538; 269/289 R, 290, 48, 58, 292, 309, 55, 56
See application file for complete search history.

(56) References Cited

U.S. PATENT DOCUMENTS 3,146,143 A * 8/1964 Bolesky et al. ............... 156/212

* cited by examiner

*Primary Examiner* — Matthew Daniels
*Assistant Examiner* — John Robitaille
(74) *Attorney, Agent, or Firm* — Dann, Dorfman, Herrell and Skillman, P.C.

(57) ABSTRACT

An apparatus for mounting planar components onto a pad for a seat is disclosed. The apparatus includes a lower die for allowing the pad to be carried thereon in a condition where a section of the pad onto which the planar components are to be mounted faces upward, a support frame for supporting the planar components, the support frame having both side portions, the support frame being configured as a handling jig which is separatably combined with the lower die means from an upward direction of the pad carried on the lower die means when the planar components are to be mounted onto the section of the pad, and an upper die means for causing the planar components supported by the support frame to be thermal press-bonded onto the section of the pad, the lower die having spaced apart guide pins for engaging the both side portions of the support frame and causing the support frame to be guided in a condition where the support frame is parallel relative to the section of the pad carried on the lower die, and hook arms for causing the support frame to be hooked with respect to the lower die.

3 Claims, 6 Drawing Sheets

APPARATUS FOR CAUSING PLANAR PARTS TO BE BONDED ONTO A SEAT PAD

TECHNICAL FIELD

The present invention relates to an apparatus for mounting planar parts or components, such as passenger detecting sensors or the like, onto a predetermined section of a pad for a seat by thermal press-bonding.

DESCRIPTION OF THE RELATED ART

Referring now to FIGS. 8 to 11, mounting of passenger detecting planar-sensors onto a section of a pad P for a seat back of an assistant seat provided with an air bag module (not shown), the pad section positionally corresponding to a resting surface of the seat back, will be discussed hereinafter in order to facilitate understanding of the present invention. First passenger-detecting sensors $S_1$, $S_2$ and a second passenger-detecting sensor $S_3$ which are shown in FIG. 8 are mounted on a central portion of the pad section, and a bulged portion of the pad section which positionally corresponds to a bank portion of the seat back; respectively, as shown in FIG. 9 (Japanese Patent Application Laid-Open No. Hei. 11-321413). The passenger detecting sensors $S_1$, $S_2$, $S_3$ are electrically connected to the air bag module and adapted to actuate the air bag module.

The mounting of the passenger detecting sensors onto the pad section may be performed by utilizing a passenger detecting planar-sensor mounting apparatus which is shown in FIG. 10. The apparatus includes a lower die means 1 for allowing the pad (not shown) to be carried thereon, a support frame 2 of a substantially rectangular-shape for supporting the passenger detecting sensors (not shown), and an upper die means 3 for causing the passenger detecting sensors supported by the support frame to be thermal press-bonded onto the pad section of the pad section.

The lower die means 1 has a base plate 1' and a receiving base 10 provided on the base plate 1'. The receiving base 10 includes a first surface section 10a on which the central portion of the pad section is to be carried, and a second surface section 10b on which the bulged portion of the pad section is to be carried. The second surface section 10b rises up from the first surface section 10a. The upper die means 3 has a base plate 3' and a heater die means 30 supported to the base plate 3'. The heater die means 30 includes a first holding-down surface section 30a for pressing the first passenger-detecting sensors $S_1$, $S_2$ (FIGS. 8 and 9) against the central portion of the pad section and causing the first passenger-detecting sensors to be thermal press-bonded onto the central portion of the pad section, and a second holding-down surface section 30b for pressing the second passenger detecting sensor $S_3$ (FIGS. 8 and 9) against the bulged portion of the pad section and causing the second passenger-detecting sensor to be thermal press-bonded onto the bulged portion of the pad section. The lower die means 1 further includes four butting rods 11a, 11b, 11c, 11d which are provided on four corners of the base plate 1' so as to stand up from the base plate 1'. Similarly, the upper die means 3 further includes four butting rods which are provided on four corners of the base plate 3' so as to hang down from the base plate 3' (only three 31a, 31b, 31c of the four butting rods of the upper die means 3 are shown in FIG. 10 and the remaining one of the four butting rods is hidden in FIG. 10). These butting rods of the lower and upper die means 1, 3 serve as means to restrict excessive pressing of the first and second holding-down surface sections 30a, 30b of the heater die means 30 against the first and second surface sections 10a, 10b of the receiving base 10 of the lower die means 1.

The support frame 2 includes a pair of spaced apart longitudinal portions 2a, 2b, a first short length portion 2c interconnecting first ends of the longitudinal portions 2a, 2b, a second short length portion 2d interconnecting second ends of the longitudinal portions 2a, 2b, and a pair of spaced apart curved-arms 2e, 2f extending from the second short length portion 2d. The curved arms 2e, 2f of the support frame 2 are coupled, via pins, to spaced apart support pieces 1a, 1b which are provided on the base plate 1' of the lower die means 1 so as to stand up from the base plate 1', so that the support frame 2 is adapted to be pivoted around the pins so as to be closed and opened with respect to the lower die means 1.

The support frame 2 is provided at the longitudinal portions 2a, 2b thereof with plural pairs of spaced apart finger means 20a, 20a', 20b, 20b' for holding the first passenger-detecting sensors $S_1$, $S_2$ in such a manner to cause the first passenger-detecting sensors to be bridgedly supported inside the support frame 2. Moreover, the support frame 2 is provided at the longitudinal portion 2a thereof with spaced apart finger means 20c, 20d for holding the second passenger-detecting sensor $S_3$ outside the support frame 2.

Referring to FIG. 11, the upper die means 3 is supported to a work frame fixed on a working table T and the lower die means 1 is movably carried on the working table T so as to be got in and out of a position under the upper die means 3. The upper die means 3 is adapted to be vertically moved by a driving cylinder. The lower die means 1 is generally located at the position under the upper die means 3. When the passenger detecting sensors are to be mounted on the pad by the apparatus, the lower die means 1 is moved forward from the position under the upper die means 3 along the table T, and the support frame 2 is then pivoted upward from the lower die means 1 so as to be opened with respect to the lower die means 1. In this condition, the pad is supported on the lower die means 1 in such a manner that the central portion of the pad section is carried on the first surface section 10a of the receiving base 10 of the lower die means 1 and the bulged portion of the pad section is carried on the second surface section 10b of the receiving base 10 of the lower die means 1. Moreover, the first passenger-detecting sensors $S_1$, $S_2$ (FIGS. 8 and 9) are held by the fingers 20a, 20a', 20b, 20b' (FIG. 10) so as to be bridged between the longitudinal portions 2a, 2b and the second passenger-detecting sensor $S_3$ (FIGS. 8 and 9) is held by the fingers 20c, 20d so as to be located outside the support frame 2. Thereafter, the support frame 2 is pivoted downward and closed with respect to the lower die means 1. In this condition, the lower die means is moved along the working table T to the position under the upper die means 3, and the thermal press-bonding of the passenger detecting sensors onto the pad is then performed by causing the upper die means 3 to be lowered.

More particularly, when the passenger detecting sensors are to be mounted on the pad by the apparatus, a worker M puts the pad P (FIG. 9), with the pad section thereof facing upward, on the receiving base 10 of the lower die means 1 and causes the passenger detecting sensors $S_1$, $S_2$, $S_3$ to be held, via the finger means 20a, 20a', 20b, 20b', 20c, 20d, with respect to the support frame 1 in the condition where the support frame 2 is opened with respect to the lower die means 1. Then, the worker causes the support frame 2 to be pivoted downward and closed with respect to the lower die means 1 having the pad carried on the receiving base 10 thereof, whereby the first passenger-detecting sensors $S_1$, $S_2$ and the second passenger-detecting sensor $S_3$ are applied onto the central portion of the pad section and the bulged portion of the pad section, respectively.

Thereafter, the lower die means 1 is moved along the working table T to the position under the upper die means 3 and the upper die means 3 is lowered toward the pad on the lower die means 1 by the driving cylinder, whereby the first holding-down surface section 30a of the heater means 30 presses the first passenger-detecting sensors $S_1$, $S_2$ against the central portion of the pad section and the second holding-down surface section 30b of the heater means 30 presses the second passenger-detecting sensor $S_3$ against the bulged portion of the pad section. Thus, the passenger detecting sensors $S_1$, $S_2$, $S_3$ are thermal press-bonded onto the pad by the first and second holding-down surface sections 30a, 30b of the heater die means 30.

In the apparatus constructed as discussed above, the support frame 2 is integrally provided at the lower die means 1, so that when the passenger detecting sensors are to be mounted onto the pad, the support frame 2 remaining attached to the lower die means 1 is moved together with the lower die means 1 toward the position under the upper die means 3 and the thermal press-bonding of the passenger detecting sensors onto the pad is then carried out by the upper die means 3. Therefore, it is impossible to carry out the work of causing different passenger-detecting sensors to be held with respect to the support frame 2 during the operation of the upper die means 3, thus making the working operability poor.

Moreover, when the support frame 2 in the condition where it having the passenger detecting sensors supported thereto is pivoted upward and opened with respect to the lower die means 1 is pivoted downward and closed with respect to the lower die means 1 having the pad carried thereon, the passenger detecting sensors held by the support frame 2 are obliquely surface-contacted with the pad for a while and compressed deformation of the pad occurs, so that there is a possibility that the passenger detecting sensors will be detached and/or shifted from the finger means 20a, 20a', 20b, 20b', 20c, 20d in cooperation with change in a thickness of the pad due to the compressed deformation of the pad. Therefore, in this case, prior to the thermal press-bonding of the passenger detecting sensors onto the pad by the upper die means 3, the passenger detecting sensors must be rearranged or repositioned with respect to the support frame 2, thus giving the cause of making the working operability worse.

SUMMARY OF THE INVENTION

The present invention has been made with a view to overcoming the foregoing problems of the related art apparatus.

It is therefore an object of the present invention to provide a planar component mounting apparatus which facilitates causing of planar components, such as passenger detecting sensors or the like, to be efficiently supported to a support frame of the apparatus and can cause the planar components to be precisely thermal press-bonded onto the pad without producing the possibility of detaching and/or shifting of the planar components from the support frame, even if change in a thickness of the pad occurs when the planar components supported by the support frame are pressed against the pad by the support frame and the pad is compressedly deformed, thus making it possible to enhance the working operability.

In accordance with the present invention, there is provided an apparatus for mounting planar components onto a pad for a seat. The apparatus comprises a lower die means for allowing a pad to be carried thereon in a condition where a section of the pad onto which the planar components are to be mounted faces upward, a support frame for supporting the planar components, the support frame having both side portions, the support frame being configured as a handling jig which is separatably combined with the lower die means from an upward direction of the pad carried on the lower die means when the planar components are to be mounted onto the section of the pad, and an upper die means for causing the planar components supported by the support frame to be thermal press-bonded onto the section of the pad, the lower die means having spaced apart guide pins for engaging the both side portions of the support frame and causing the support frame to be guided in a condition where the support frame is parallel relative to the section of the pad carried on the lower die means, and hook arms for causing the support frame to be hooked with respect to the lower die means.

In the planar component mounting apparatus according to the present invention, the support frame is configured as a member independent of the lower die means. Therefore, if an additional support frame which is constructed in the same manner as the support frame is done is previously prepared, work of causing different planar components to be supported with respect to the additional support frame can be performed, even during the thermal press-bonding of the planar components onto the pad by the upper die means, so that when the thermal press-bonding of the planar components onto the pad by the upper die means is completed, the pad having the planar components thermal press-bonded thereon is removed from the lower die means, and a new pad is carried on the lower die means, the additional support frame having the different planar components previously supported thereto can be combined with the lower die means without time lag, thus making it possible to improve the working operability for mounting the planar components onto the pad.

In addition, the support frame has the both side portions and can be carried on the pad on the lower die means while being engaged at the both side portions with the guide pins of the lower die means and guided by the guide pins of the lower die means in the condition where the support frame is parallel relative to the section of the pad, so that the planar components supported to the support frame are prevented from being detached and/or shifted from the support frame and can be precisely carried on the pad, thus saving the worker the trouble of repositioning the planar components with respect to the support frame prior to the thermal press-bonding of the planar components onto the pad by the upper die means.

Moreover, the lower die means is provided with the guide pins for engaging the both side portions of the support frame and guiding the support frame, and the hook arms for causing the support frame to be hooked with respect to the lower die means, so that even if change in a thickness of the pad occurs due to compressed deformation of the pad when the support frame is combined with the lower die means having the pad carried thereon, the planar components can be precisely carried on the pad, thus making it possible to cause the planar components to be precisely thermal press-bonded onto the pad by the upper die means.

In a preferred embodiment of the present invention, the support frame is provided with engaging plates so as to be arranged spacedly apart the both side portions of the support frame. The engaging plates have through-holes which are adapted to be fitted over the guide pins when the support frame is combined with the lower die means.

In the apparatus according to the embodiment of the present invention, the support frame can be stably carried on the pad on the lower die means while causing the through-holes to be fitted over the guide pins in a manner to allow the support frame to be parallel relative to the pad.

In an embodiment of the present invention, the hook arms are provided at the lower die means so as to be located at positions that positionally correspond to middle portions of the both side portions when the support frame is combined with the lower die means, and the guide pins are spaced at equal intervals apart from the hook arms on the both sides of the hook arms.

In the apparatus according to the embodiment of the present invention, the hook means are provided at the lower die means so as to be located at the positions that positionally correspond to the middle portions of the both side portions of the support frame, and the guide pins are spaced at equals intervals apart from the hook arms on the both sides of the hook arms, so that support frame can be stably carried on the pad on the lower die means while being guided by the guide pins, and can be stably hooked with respect to the lower die means by the hook arms.

DETAILED DESCRIPTION OF THE PREFERRED EMBODIMENT

Figure 1:
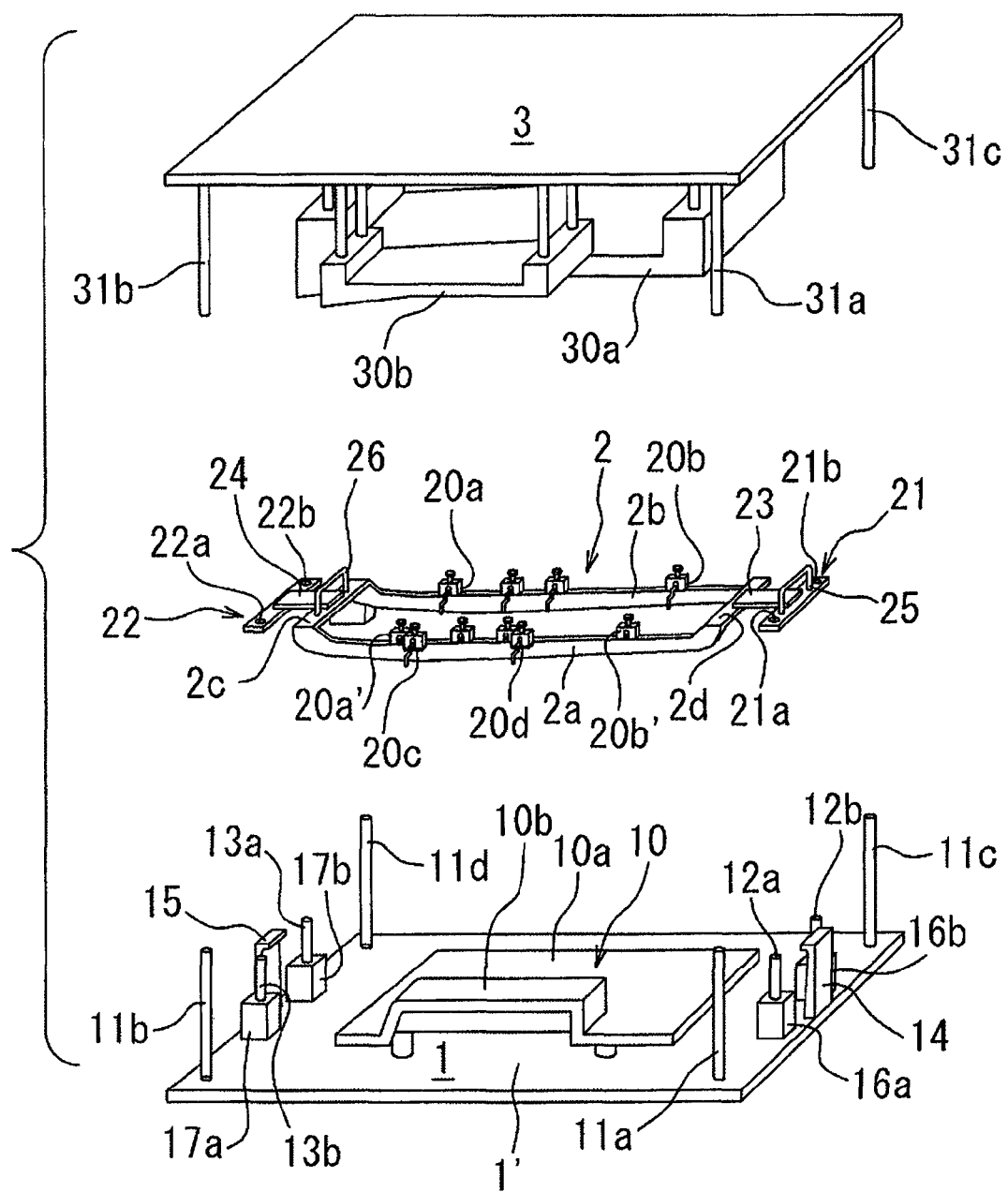
FIG. 1 is a schematic exploded perspective view of a planar component mounting apparatus according to an embodiment of the present invention.

Referring to FIG. 1, there is illustrated a planar component mounting apparatus according to an embodiment of the present invention, which is adapted to cause planar components, such as passenger detecting sensors or the like, to be mounted onto a section of a pad for a seat back, which positionally corresponds to a resting surface of the seat back. Like the planar component mounting apparatus of FIGS. 10 and 11, the apparatus according to the embodiment of the present invention includes a lower die means 1 on which the pad is to be carried, a support frame 2 for supporting first passenger-detecting sensors and a second passenger-detecting sensor, and an upper die means 3 for causing the first and second passenger-detecting sensors to be thermal press-bonded onto the pad.

Figure 10:
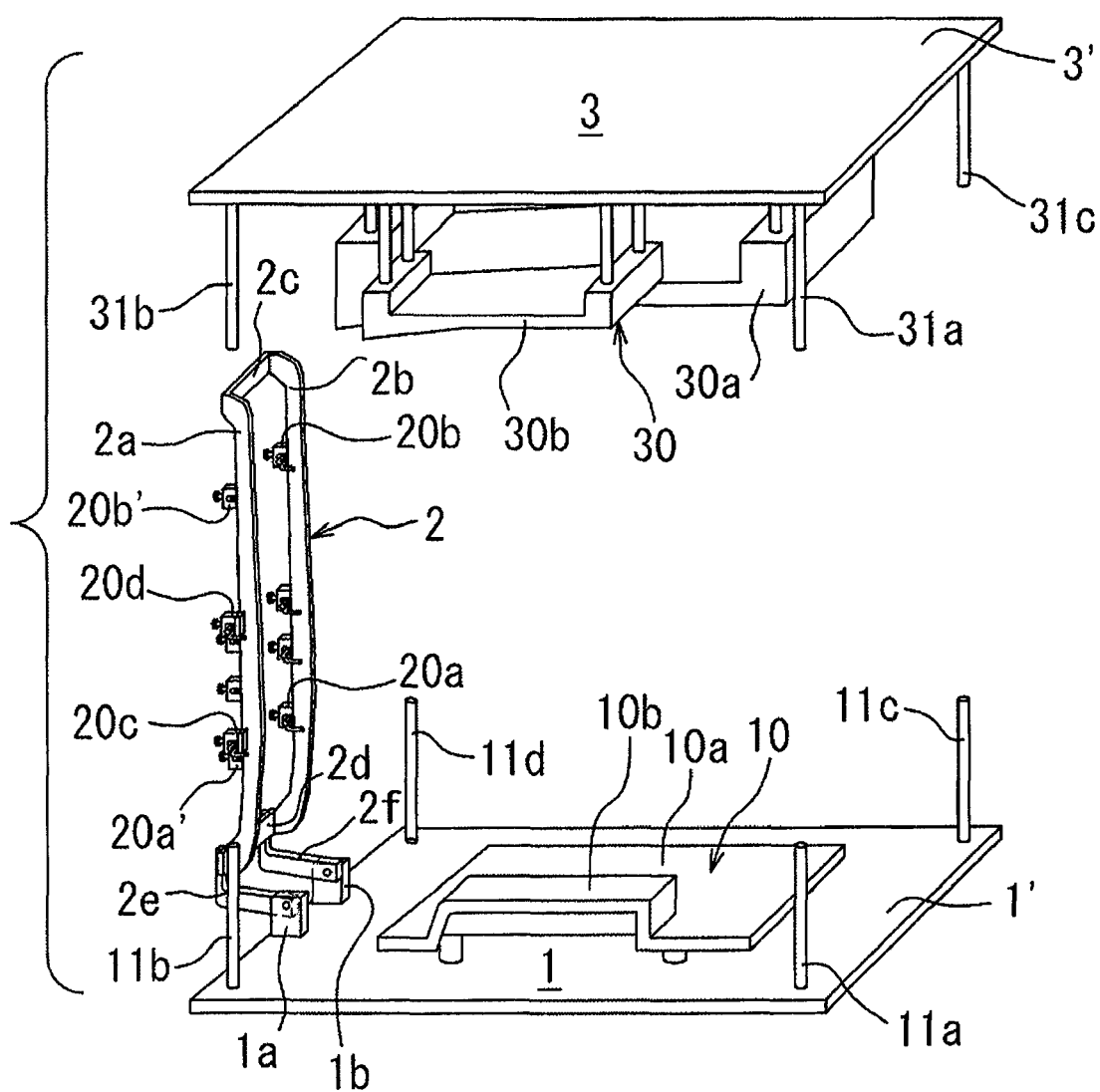
FIG. 10 is a schematic perspective view of a related art apparatus for mounting planar components onto a pad.
Figure 11:
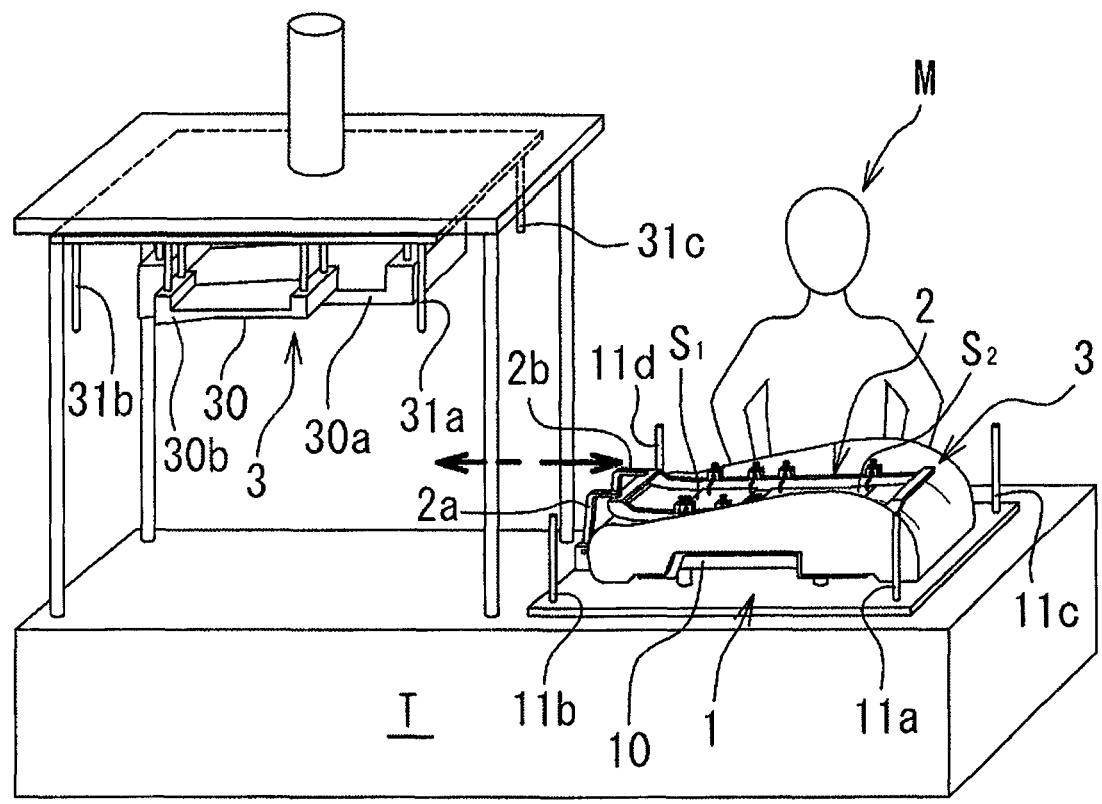
FIG. 11 is a schematic perspective view of the entire related-art apparatus.

The upper die means 3 is basically identical to that of the apparatus shown in FIGS. 10 and 11. Therefore, the description of the upper die means 3 is not repeated. The lower die means 1 is movably carried on the working table T so as to be got in and out of a position under the upper die means 3. The lower die means 1 may be carried on the working table T so as to be movable on the working table T through a rail mechanism (not shown) laid on the working table T. In FIGS. 1 to 7, components which are substantially similar to those shown in FIGS. 8 to 11 are designated with like reference numerals.

The lower die means 1 includes a base plate 1', a receiving base 10 provided on the base plate 1' for supporting the pad, butting rods 11a-11d provided on four corners of the base plate 1' so as to stand up from the base plate 1', guide pins 12a, 12b, 13a, 13b provided at both sides of the base plate 1', and hook arms 14, 15 provided at the both sides of the base plate 1'. The receiving base 10 has a first surface section 10a on which a central portion of the section of the pad is to be carried, and a second surface section 10b on which a bulged portion of the section of the pad is to be carried and which rises up from the first surface section 10a.

In the apparatus according to the embodiment of the present invention, the support frame 2 is configured as a handling jig independent of the lower die means 1 and adapted to be removably combined with the lower die means 1. More particularly, the support frame 2 is adapted to be combined with the lower die means 1 so as to be carried on the pad carried on the lower die means 1, while being engaged at short length side portions 2c, 2d thereof (which will be discussed in greater detail hereinafter) with the guide pins 12a, 12b, 13a, 13b and guided by the guide pins 12a, 12b, 13a, 13b in a condition where the support frame is parallel relative to the pad carried on the lower die means 1. When the support frame 2 is carried on the pad on the lower die means 1 and combined with the lower die means 1 while pressing the pad against the lower die means 1, the support frame 2 is hooked with respect to the lower die means 1 by the hook arms 14, 15.

The hook arms 14, 15 are provided at regions of the both sides of the base plate 1' which positionally correspond to middle regions of the short length side portions 2c, 2d of the support frame 2 when the support frame 2 is combined with the lower die means 1. The guide pins 12a, 12b are arranged on one of the both sides of the base plate 1' and spaced at equal intervals apart from the hook arm 14 on both sides of the hook arm 14. Similarly, the guide pins 13a, 13b are arranged on the other of the both sides of the base plate 1' and spaced at equal intervals apart from the hook arm 15 on both sides of the hook arm 15. The guide pins 12a, 12b, 13a, 13b rise up from top surfaces of support bases 16a, 16b, 17a, 17b provided on the base plate 1'. Upper portions of the hook arms 14, 15 are configured so as to be elastically deformable, whereby the upper portions of the hook arms 14, 15 can be disengageably engaged with the side portions 2c, 2d of the support frame 2.

Figure 2:
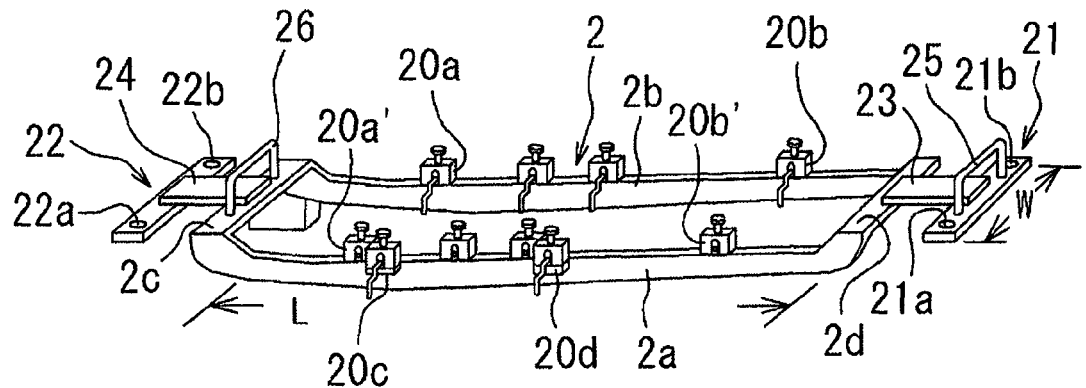
FIG. 2 is a schematic perspective view of a planar component supporting frame with which the apparatus of FIG. 1 is provided.

Referring to FIG. 2, there is illustrated the support frame 2 which is configured as the handling jig which is independent of the lower die means 1. The support frame 2 is formed substantially into a rectangular shape and includes a pair of spaced apart longitudinal portions 2a, 2b, the short length side portion 2c interconnecting ends of the longitudinal portions 2a, 2b, and the short length side portion 2d interconnecting the other ends of the longitudinal portion 2a, 2b. A width W of the support frame 2 which is measured in a length direction of the short length side portions 2c, 2d is substantially equivalent to a width of the central portion of the pad which extends toward a boundary between the central portion of the pad and the bulged portion of the pad. Each of the longitudinal portions 2a, 2b of the support frame 2 has a shape curved along such a direction as to be indicated in FIG. 2 by reference designator L, which matches a curved shape of a region of the pad which is adjacent the bulged portion of the pad.

Plural pairs of first finger means 20a, 20a', 20b, 20b' for causing the first passenger-detecting sensors $S_1$, $S_2$ to be bridgedly supported inside the support frame 2 are provided at the longitudinal portions 2a, 2b of the support frame 2. Moreover, a plurality of second finger means 20c, 20d for causing the second passenger-detecting sensor $S_3$ to be supported with respect to the longitudinal portion 2a outside the support frame 2 are provided at the longitudinal portion 2a. The number of the plural pairs of first finger means 20a, 20a', 20b, 20b' may be set according to an area of each of the first passenger detecting sensors $S_1$, $S_2$. Similarly, the number of the plurality of the second finger means 20c, 20d may be set to two or more according to an area of the second passenger detecting sensor $S_3$. Each of the first and second finger means includes a finger pin which is to be releasably fitted in an insertion hole formed in a corresponding passenger-detecting sensor.

Figure 3:
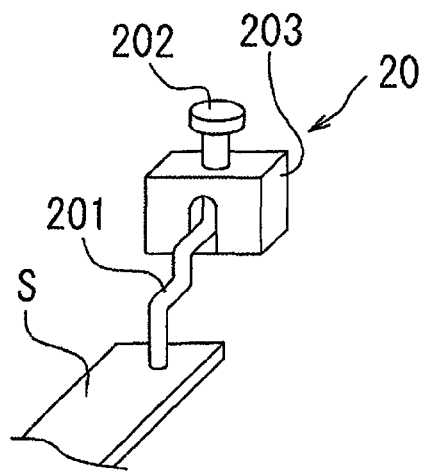
FIG. 3 is a schematic perspective view illustrating an example of a finger means which may be provided at the planar component supporting frame of FIG. 3.
Figure 4:
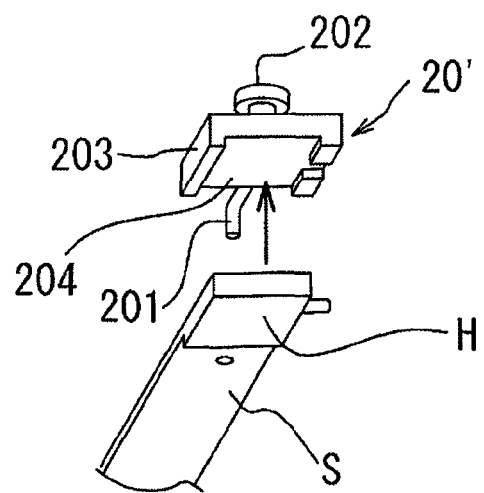
FIG. 4 is a schematic perspective view illustrating another example of the finger means which may be employed together with the finger means of FIG. 3.

As the plurality of first and second finger means, a plurality of finger means 20 shown in FIG. 3 (only one finger means 20) and a plurality of finger means 20' shown in FIG. 4 (only one finger means 20' is shown in FIG. 4) may be employed in pairs. Each of the finger means 20 is adapted to support a body S of a corresponding passenger-detecting sensor. Each of the finger means 20' is adapted to hold a harness H of a corresponding passenger-detecting sensor.

As shown in FIGS. 3 and 4, each of the finger means 20, 20' includes a base frame 203, an operating knob 202 which is supported to the base frame 203 so as to be vertically movable, and a substantially L-shaped finger pin 201 which is integral with the operating knob 202 and adapted to be releasably fitted in an insertion hole (not shown) formed in the body S of the corresponding passenger-detecting sensor. As shown in FIG. 4, the base frame 203 of each of the finger means 20' is provided at a bottom thereof with a recess portion 204 which is to be releasably fitted on the harness H of the corresponding passenger-detecting sensor. The finger pin 201 has a length which allows the finger pin 201 to support the corresponding passenger-detecting sensor in a condition where the passenger detecting sensor is flush with a bottom surface of the support frame 2.

The support frame 2 may have engaging plates 21, 22 which are to be engaged with the guide pins 12a, 12b, 13a, 13b of the lower die means 1 when the support frame 2 is combined with the lower die means 1. More particularly, the engaging plates 21, 22 are supported to the side portions 2c, 2d of the support frame 2 through connecting plates 23, 24 so as to be substantially parallel to the side portions 2c, 2d. The engaging plate 21 and the engaging plate 22 are formed with through-holes 21a, 21b, which are to be fitted over the guide pins 12a, 12b of the lower die means 1, and through-holes 22a, 22b, which are to be fitted over the guide pins 13a, 13b, respectively. While a shape of each of the through-holes 12a, 12b, 13a, 13b may of various shapes, it is preferably a circular-shape if each of the guide pins 12a, 12b, 13a, 13b is formed into a circular shape in cross-section.

The support frame 2 further includes substantially U-shaped handle bars 25, 26 which are to be gripped by the worker. The handle bar 25 is provided on the engaging plate 21 so as to stand up from the engaging plate 21 in order to facilitate fitting of the through-holes 21a, 21b of the support frame 2 over the guide pins 12a, 12b of the lower die means 1. On the other hand, the handle bar 26 is provided on the side portion 2c of the support frame 2 so as to stand up from the side portion 2c in view of convenience in gripping the handle bars.

Figure 5:
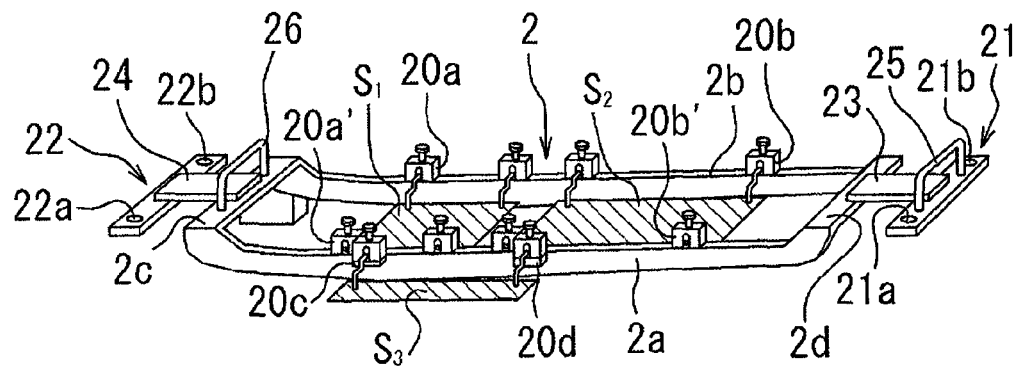
FIG. 5 is a schematic perspective view of the planar component supporting frame in which planar components are supported to the supporting frame.

When the passenger detecting sensors are to be mounted on the pad by utilizing the apparatus of the present invention constructed as discussed above, the work grips causes the pad to be carried on the receiving base 10 of the lower die means 1 in such a manner that the pad section onto which the passenger detecting sensors are to be mounted faces upward. Moreover, as shown in FIG. 5, the passenger detecting sensors $S_1$, $S_2$, $S_3$ are held with respect to the support frame 2 by the finger means. Thereafter, the worker grips the handle bars 25, 26 and causes the support frame 2 having the passenger detecting sensors supported thereto to be combined with the lower die means 1 in such a manner that the passenger detecting sensors are carried on the pad section of the pad on the receiving base 10 of the lower die means 1.

Figure 6:
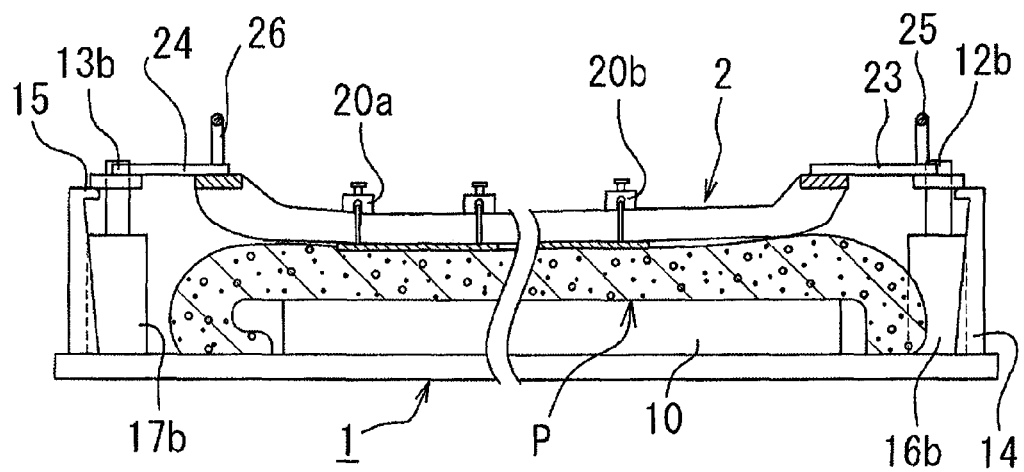
FIG. 6 is a schematic sectional view of the planar component supporting frame which is combined with a lower die means of the apparatus through a pad.

Putting of the passenger detecting components on the pad section from an upward direction of the pad can be stably performed while causing the support frame 2 to be parallel to the pad P on the lower die means 1 by causing the through-holes 21a, 21b, 22a, 22b of the support frame 2 to be fitted over the guide pins 12a, 12b, 13a, 13b of the lower die means 1, as shown in FIG. 6. Thus, the passenger detecting sensors $S_1$ to $S_3$ are prevented from being detached and/or shifted from the finger means 20a, 20a', 20b, 20b', 20c, 20d and can be precisely positioned on the pad P, so that repositioning of the passenger detecting sensors with respect to the support frame 2 is not required after the support frame 2 is combined with the lower die means 1.

Figure 7:
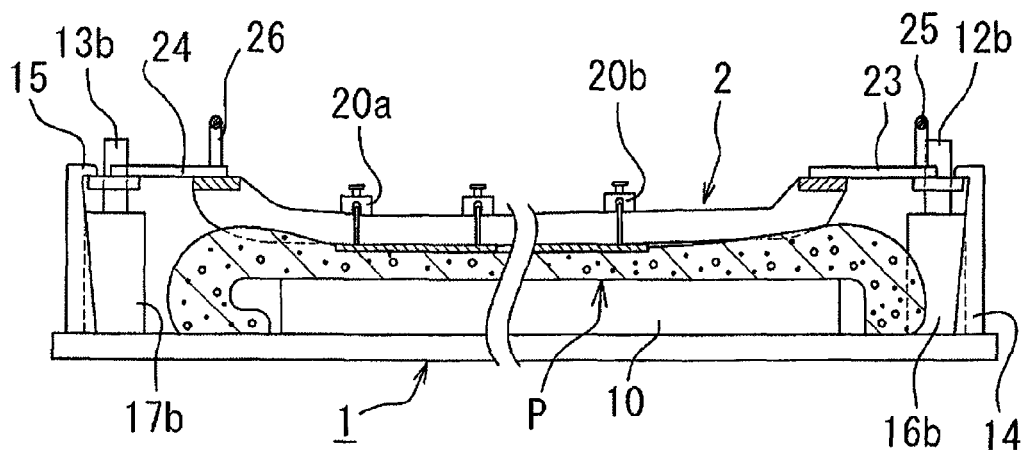
FIG. 7 is a schematic sectional view of the planar component supporting frame which is hooked with respect to the lower die means by hook arms of the lower die means.
Figure 8:
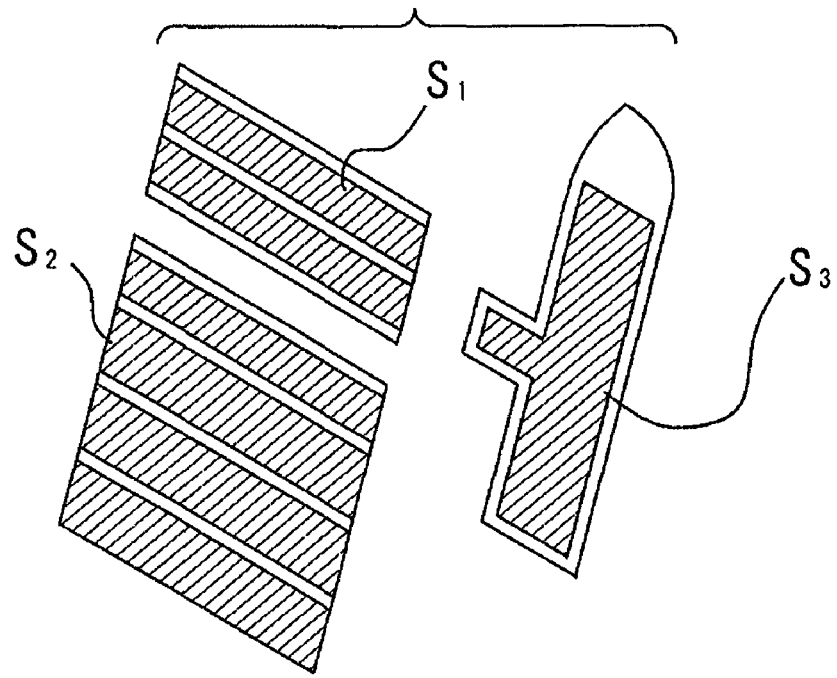
FIG. 8 is a schematic perspective view illustrating passenger detecting sensors which are examples of the planar components.
Figure 9:
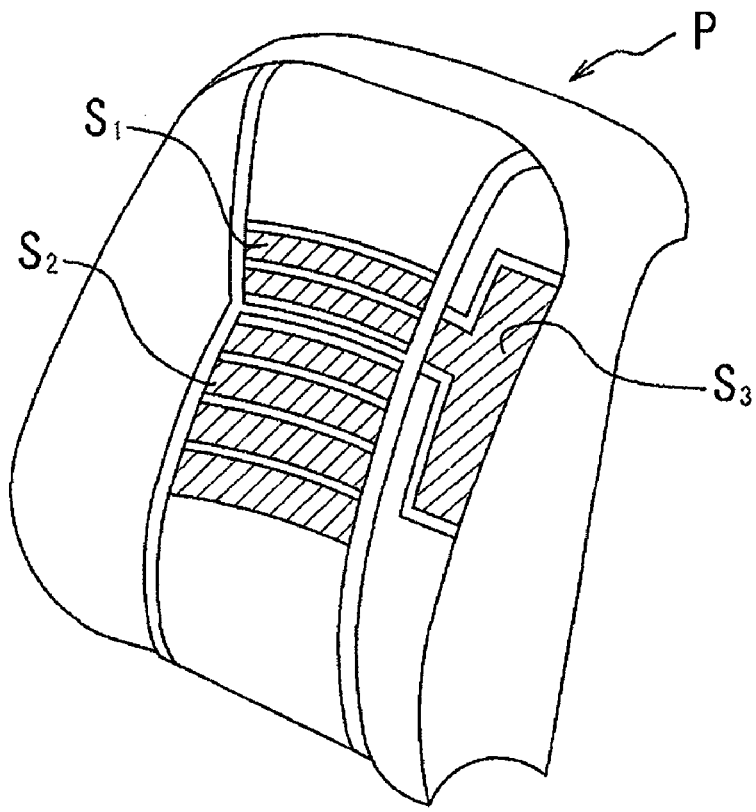
FIG. 9 is a schematic perspective view illustrating the pad on which the planar components are mounted.

When the worker causes the support frame 2 having the passenger detecting sensors $S_1$ to $S_3$ supported thereto to be carried on the pad on the receiving base 10 of the lower die means 1, and pushes the support frame 2 down against the pad P while causing the pad P to be compressedly deformed and causing the engaging plates 21, 22 to be operatively engaged with the hook arms 14, 15, the hook arms 14, 15 are elastically deformed laterally by the engaging plates 21, 22 and then restored to their original states to thereby become engaged with top surfaces of the engaging plates 21, 22 as shown in FIG. 7. Thus, the support frame 2 is hooked with respect to the lower die means 1 by the hook arms 14, 15.

As discussed above, the hook arms 14, 15 are provided on the regions of the both sides of the base plate 1' which positionally correspond to the middle regions of the side portions 2c, 2d of the support frame 2, the guide pins 12a, 12b are spaced at equal intervals apart from the hook arm 14 on the both sides of the hook arm 14, and the guide pins 13a, 13b are spaced at equal intervals apart from the hook arm 15 on the both sides of the hook arm 15, so that the support frame 2 can be stably put on the pad P on the receiving base 10 of the lower die means 1 while being guided by the guide pins 12a, 12b, 13a, 13b in a condition where the support frame 2 is parallel to the pad P, and the support frame 2 can be stably hooked with respect to the lower die means 1 by the hook arms 14, 15 while causing the pad to be compressedly deformed.

Regarding positions at which the hook arms 14, 15 are engaged with the support frame 2, the positions are sufficient if they are spaced several millimeters apart from the support frame 2 in the condition where the support frame 2 is combined with the lower die means 1. Engagement of the support frame 2 with the lower die means 1 by the hook arms 14, 15 causes the passenger detecting sensors $S_1$ to $S_3$ to be positively and precisely positioned on the pad P, even if the pad is compressedly deformed by the support frame 2, whereby the thickness of the pad is changed.

The lower die means 1 with which the support frame 2 is combined as discussed above is moved to the position under the upper die means 3 along the table T (FIG. 11). Thereafter, by the driving cylinder of the upper die means 3, the upper die means 3 is moved downward toward the lower die means 1 with which the support frame 2 is combined. At this time, the first holding-down surface portions 30a of the upper die means 3 can cause the first passenger-detecting sensors $S_1$, $S_2$ to be precisely thermal press-bonded onto the center portion of the pad P and the second holding-down surface portion 30b of the upper die means 3 can cause the second passenger-detecting sensor $S_3$ to be precisely thermal press-bonded onto the bulged portion of the pad P.

After the passenger detecting sensors $S_1$ to $S_3$ are mounted on the pad P by the upper die means 3 as discussed above and the upper die means 3 is moved upward by the driving cylinder, the lower die means 1 is moved out of the position under the upper die means 3 along the table T, and the worker then causes the support frame 2 to be released from the hook arms 14, 15 of the lower die means 1. In this condition, when the worker grips handle bars 25, 26 and lifts the support frame 2 up, the finger means 20a, 20a', 20b, 20b' 20c, 20d are separated from the passenger detecting sensors $S_1$ to $S_3$ thermal press-bonded on the pad P. Thus, the pad P on which the passenger detecting sensors $S_1$ to $S_3$ are thermal press-bonded can be removed from the lower die means 1.

According to the planar component mounting apparatus constructed as discussed above, if an additional support frame which is constructed in the same manner as the support frame 2 is done is previously prepared, work of causing different passenger-detecting sensors to be previously supported with respect to the additional support frame can be performed, even during the thermal press-bonding of the passenger detecting sensors $S_1$ to $S_3$ to the pad by the upper die means 3. Therefore, when the pad having the passenger detecting sensors $S_1$ to $S_3$ thermal press-bonded thereon is removed from the lower die means 1 and a new pad is then carried on the lower die means 1, the additional support frame having the different passenger-detecting sensors previously supported thereto can be combined with the lower die means 1 without time lag, thus improving working operability for causing passenger detecting sensors to be mounted on the pad.

While the case where the present invention is applied to the planar component mounting apparatus for mounting the passenger detecting sensors onto the pad for the seat back of the seat has been discussed above with reference to the embodiment of the present invention, the present invention may be applied to a mounting apparatus for mounting passenger detecting sensors onto a pad for a seat cushion of the seat. In addition, the planar components which are to be mounted onto the pad by the apparatus according to the present invention are not limited to the passenger detecting sensors but may be any planar components other than the passenger detecting sensors.

The terms and expressions which have been employed are used as terms of description and not of limitation, and there is no intention in the use of such terms and expressions of excluding any equivalents of the features shown and description, or portions thereof, but it is recognized that various modifications are possible with the scope of the invention claimed.

What is claimed is:

1. An apparatus for mounting planar components onto a pad for a seat, said apparatus comprising:
    a lower die means for allowing a pad to be carried thereon in a condition where a section of said pad onto which said planar components are to be mounted faces upward;
    a support frame for supporting said planar components; and
    an upper die means for causing said planar components supported by said support frame to be thermal press-bonded onto said section of said pad;
    said upper die means being fixed to a working table and adapted to be vertically movable;
    said lower die means being adapted to be horizontally movable relative to said upper die means along said working table so as to be movable into and out of a position under said upper die means when said upper die means is in a state of being at a high location;
    said support frame having first and second side portions;
    said support frame being configured as a handling jig which is separatably combined with said lower die means from an upward direction of said pad carried on said lower die means when said planar components are to be mounted onto said section of said pad; and
    said lower die means having spaced apart guide pins for releasably engaging said first and second side portions of said support frame and causing said support frame to be guided in a condition where said support frame is parallel relative to said section of said pad carried on said lower die means, and hook arms for causing said support frame to be releasably hooked with respect to said lower die means.

2. An apparatus according to claim 1, wherein said support frame is provided with engaging plates arranged spacedly apart from said first and second side portions of said support frame, said engaging plates having through-holes which are adapted to be fitted over said guide pins when said support frame is combined with said lower die means.

3. An apparatus according to claim 1 or 2, wherein said hook arms are provided at said lower die means so as to be located at positions that positionally correspond to middle portions of said first and second side portions of said support frame when said support frame is combined with said lower die means, and wherein said guide pins are spaced at equal intervals apart from said hook arms on the both sides of said hook arms.

* * * * *